(12) United States Patent
Ahn et al.

(10) Patent No.: US 11,676,372 B2
(45) Date of Patent: Jun. 13, 2023

(54) OBJECT/REGION DETECTION AND CLASSIFICATION SYSTEM WITH IMPROVED COMPUTER MEMORY EFFICIENCY

(71) Applicant: KOREA INSTITUTE OF SCIENCE AND TECHNOLOGY, Seoul (KR)

(72) Inventors: Sang Chul Ahn, Seoul (KR); Junseok Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 251 days.

(21) Appl. No.: 17/206,849

(22) Filed: Mar. 19, 2021

(65) Prior Publication Data

US 2022/0188557 A1 Jun. 16, 2022

(30) Foreign Application Priority Data

Dec. 15, 2020 (KR) .................. 10-2020-0175036

(51) Int. Cl.
*G06K 9/62* (2022.01)
*G06V 10/94* (2022.01)
(Continued)

(52) U.S. Cl.
CPC .......... *G06V 10/94* (2022.01); *G06F 18/214* (2023.01); *G06F 18/2113* (2023.01);
(Continued)

(58) Field of Classification Search
CPC .......... G06T 1/60; G06T 7/10–7/194; G06T 2207/20112–2207/20168;
(Continued)

(56) References Cited

U.S. PATENT DOCUMENTS 10,733,756 B2  8/2020  Choi et al.
10,747,709 B2  8/2020  Dobbs et al.
(Continued)

FOREIGN PATENT DOCUMENTS

JP   2011227868 A   11/2011
JP   2016057793 A    4/2016

OTHER PUBLICATIONS

Seoung Wug Oh et al., "Video Object Segmentation using Space-Time Memory Networks," IEEE/CVF International Conference on Computer Vision, 2019, pp. 9226-9235.

*Primary Examiner* — Brian Werner
(74) *Attorney, Agent, or Firm* — Rabin & Berdo, P.C.

(57) ABSTRACT

The present disclosure relates to an object detection and classification system with higher accuracy and resolution in a less computer memory environment. The system comprises an input value generation unit to receive an input image and generate an input value including feature information; a memory value generation unit to receive a reference image and generate a memory value including feature information; a memory management unit to select information having high importance from the memory values and store in a computer memory; an aggregated value generation unit to compute similarity between the input value and the memory value, calculate a weighted sum to generate an integrated value, and aggregate the integrated value and the input value; and an object detection unit to detect or classify the object from the input image using the aggregated value.

9 Claims, 21 Drawing Sheets

(51) Int. Cl.
*G06V 10/25* (2022.01)
*G06F 18/22* (2023.01)
*G06F 18/214* (2023.01)
*G06F 18/2113* (2023.01)
*G06F 18/2413* (2023.01)
*G06V 10/44* (2022.01)
*G06V 10/774* (2022.01)
G06F 18/213 (2023.01)

(52) U.S. Cl.
CPC .......... *G06F 18/22* (2023.01); *G06F 18/2413* (2023.01); *G06V 10/25* (2022.01); *G06V 10/443* (2022.01); *G06V 10/774* (2022.01); G06F 18/213 (2023.01)

(58) Field of Classification Search
CPC ............. G06T 7/20–7/292; G06T 1/20; G06T 2200/28; G06F 18/2413–18/24147; G06V 10/764–10/765; G06V 20/698; G06V 10/40–10/62; G06V 10/25; G06V 10/462–10/464; G06V 10/70–10/87; G06V 10/94–10/955; G06N 3/08–3/0985; G06N 3/04–3/043
See application file for complete search history.

(56) References Cited

U.S. PATENT DOCUMENTS

2017/0200077 A1 7/2017 Weston et al.
2020/0074589 A1* 3/2020 Stent ....................... G06F 3/013

* cited by examiner

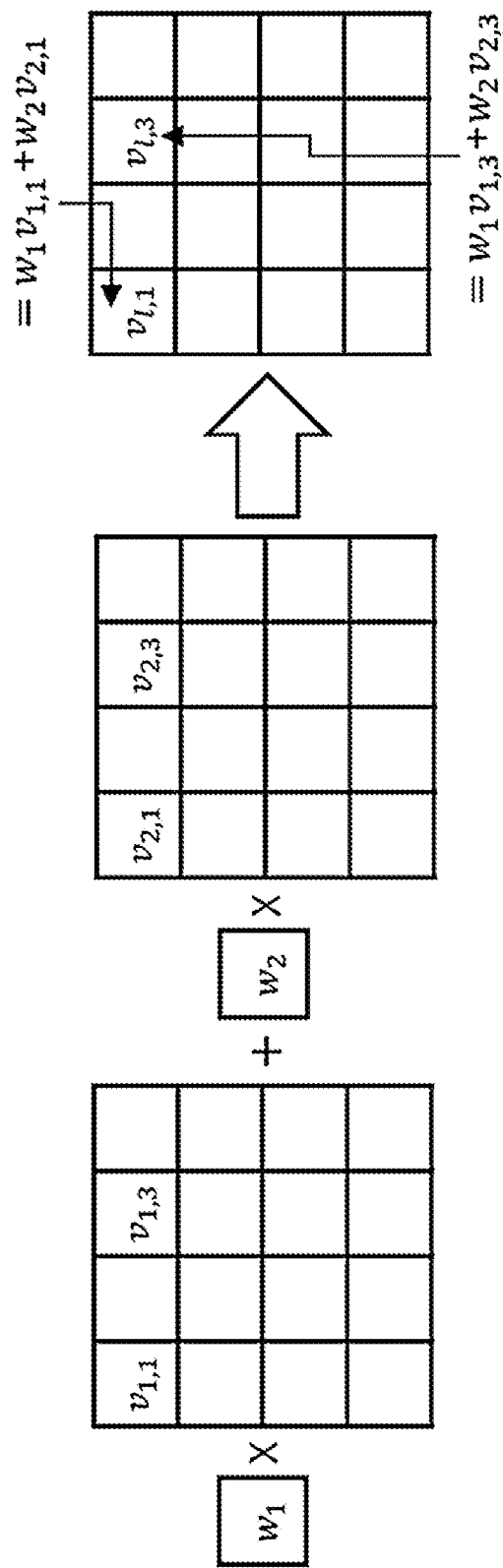

OBJECT/REGION DETECTION AND CLASSIFICATION SYSTEM WITH IMPROVED COMPUTER MEMORY EFFICIENCY

CROSS-REFERENCE TO RELATED APPLICATION

This application claims priority to Korean Patent Application No. 10-2020-0175036, filed on Dec. 15, 2020, and all the benefits accruing therefrom under 35 U.S.C. § 119, the contents of which in its entirety are herein incorporated by reference.

BACKGROUND

1. Field

The present disclosure relates to a system for object or region detection or classification in an input image with improved memory efficiency.

2. Description of the Related Art

Detection or classification of an object (or region) of interest in an input image using a reference image is used in a variety of computer vision applications (for example, object tracking, background removal, lesion detection, diagnosis, etc.). Recently, it is possible to achieve object detection and classification with high accuracy using machine-learning models.

FIG. 1 shows the structure of a space-time memory (STM) network, one of the existing object detection methods. It detects an object of interest in a current frame by referring to the location of the object of interest in past frames of a video via the memory network. As can be seen from FIG. 1, the existing method employs the memory network developed in the natural language processing and separately uses the output of an encoder for each of key and value.

The existing STM object detection system has the following problems.

In the image processing, information included in key and value may overlap, resulting in low memory efficiency. The existing method uses the memory network structure developed in the natural language processing, and thus key and value are distinguished from each other, and the key is used to calculate the similarity of an image and the value is used to detect (or classify). However, in the case of an image, key and value are not clearly distinguished from each other, and thus when key and value are separately used, memory efficiency reduces due to unnecessary information overlap.

The existing method predicts the motion of an object in the current frame by combining the motion of the object in the past frames stored in the memory, and is performed by simply adding one frame to the memory every predetermined number of frames. This method does not consider similarity or usability between information stored in the memory, so even in case that a change of the object in the frames is very small, a large number of similar frames are stored in the memory, causing unnecessary memory usage.

The existing method requires much computer memory to process a high resolution image, and thus is unsuitable for processing of an input image of a predetermined size or more.

SUMMARY

The present disclosure is designed to solve the problem of the existing memory network based object detection system, and therefore the present disclosure is directed to providing an object/region detection and classification system with memory efficiency and high accuracy by applying a module capable of efficiently managing a computer memory and an object detection algorithm for a high resolution image.

An object detection and classification system with improved computer memory efficiency according to an embodiment includes an input value generation unit to receive an input image including an object intended to detect and classify and generate an input value including feature information; a memory value generation unit to receive a reference image associated with the object and generate a memory value including feature information; a memory management unit to select information having high importance from the memory values and store in a computer memory; an aggregated value generation unit to compute similarity between the input value generated from the input image and the memory value stored in the computer memory, calculate a weighted sum to generate an integrated value, and aggregate the integrated value and the input value to generate an aggregated value; and an object detection unit to detect or classify the object from the input image using the aggregated value.

According to an embodiment, the aggregated value generation unit may calculate a similarity vector by computing the similarity between the input value and the memory value grid wise, calculate the weighted sum of memory values grid wise based on the similarity vector and convert to an integrated value.

According to an embodiment, the memory management unit may store a newly generated memory value in the computer memory only when the importance of the newly generated memory value is equal to or higher than a predetermined value, to increase memory efficiency, and delete a memory value having highest similarity or an oldest memory value among already stored memory values from the computer memory when a new memory value is added to the computer memory that has a limited size.

According to an embodiment, as the similarity with the already stored memory values is lower and noise included in the image is less, the importance of the memory value may be measured higher.

According to an embodiment, the input value generation unit may include an input unit encoder implemented as a machine-learning model for compressing the input image into high level information; and an input value model for receiving output of the input unit encoder and generating an input value including high level feature information, and the memory value generation unit may include a memory unit encoder implemented as a machine-learning model for compressing the reference image into high level information; and a memory value model for receiving output of the memory unit encoder and generating a memory value including high level feature information.

According to an embodiment, the input unit encoder and the memory unit encoder may be configured as a same machine-learning model sharing weights.

According to an embodiment, the input value model and the memory value model may be configured as a same value model sharing weights.

A method for detecting or classifying an object in a high resolution image according to an embodiment includes a first step of receiving a high resolution input image with resolution of a predetermined value or more; a second step of reducing the input image at a predetermined ratio through multiple steps to acquire reduced images; a third step of selecting a smallest one of the reduced images as an initial processing image; a fourth step of splitting the processing image into a plurality of segments of a same size; a fifth step of detecting or classifying the object in the processing image using the object detection and classification system according to any one of claims 1 to 7; a sixth step of determining if the processing image has a same size as the high resolution input image; a seventh step of, when the processing image has a smaller size than the high resolution input image, selecting and returning a segment including the object among the plurality of segments of the processing image based on a detection and classification result, cropping a segment corresponding to the returned segment from the reduced image of a higher level that is less reduced than the processing image, returning to the processing image, and repeatedly performing the fourth to sixth steps on the returned processing image; and an eighth step of returning the detection and classification result to output when the processing image has the same size as the high resolution input image.

There is provided a computer program stored in a computer-readable recording medium for performing the method for detecting or classifying an object in a high resolution image according to an embodiment.

According to the object detection and classification system in accordance with an embodiment, it is possible to detect or classify an object in an image with higher accuracy in a less computer memory environment than the existing method. Additionally, it is possible to detect or classify an object in a high resolution image of a size that is impossible for the existing method with low memory efficiency to process.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of description, illustration of some elements in the drawings may be exaggerated and omitted.

FIGS. 5A to 5D are diagrams for describing an operating principle of a model according to the related art.

DETAILED DESCRIPTION

Hereinafter, the embodiments will be described in detail with reference to the accompanying drawings and the description in the accompanying drawings, but the claimed scope is not restricted or limited by the embodiments.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be defined based on the meaning of the terms and the context throughout the specification, rather than simply the name of the terms.

Additionally, the embodiment described herein may have aspects of entirely hardware, partly hardware and partly software, or entirely software. The term "unit", "module", "device" or "system" as used herein refers to computer related entity such as hardware, hardware and software in combination, or software. For example, the unit, module, device, server or system may refer to hardware that makes up a platform in part or in whole and/or software such as an application for operating the hardware.

Hereinafter, the embodiments of the present disclosure are described in detail with reference to the accompanying drawings.

Figure 1:
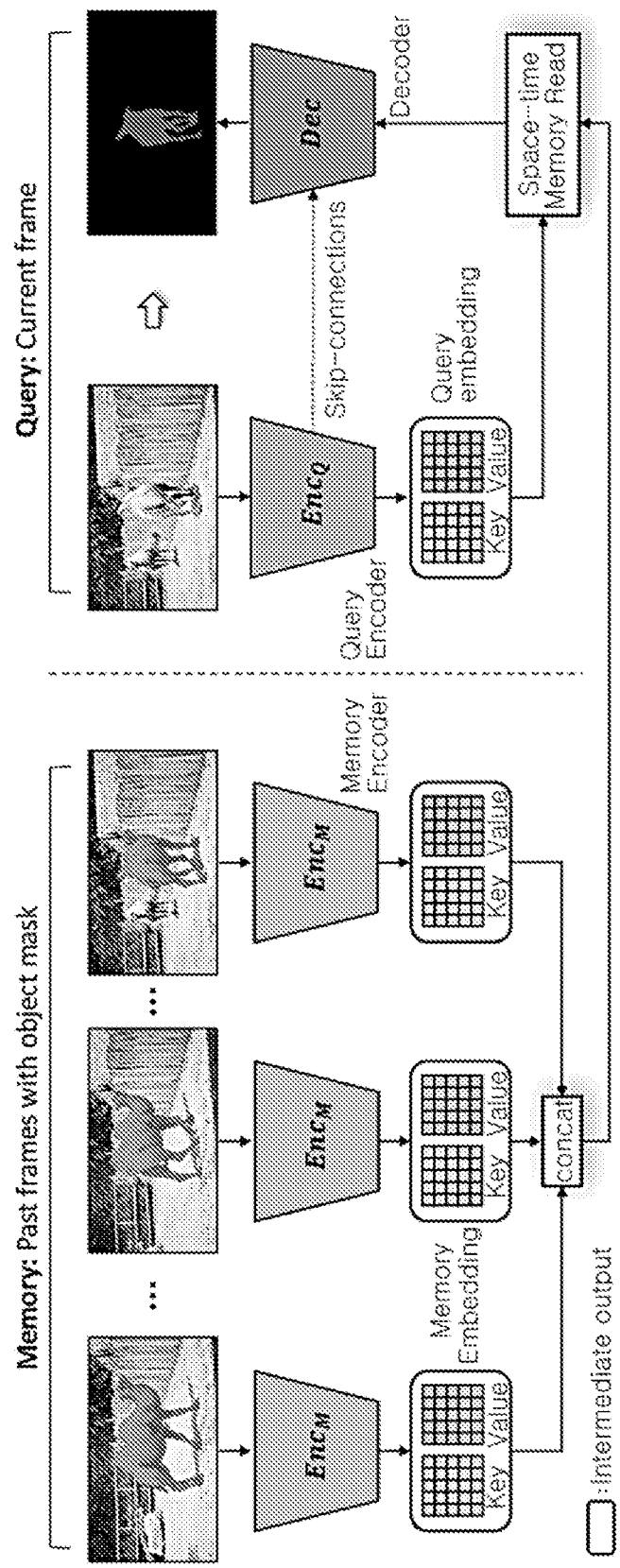
FIG. 1 shows the structure of an object detection and classification system using a memory network according to the related art.

FIG. 1 shows the structure of an object detection and classification system using a memory network according to the related art. The existing method employs the memory network developed in the natural language processing, and separately uses the output of an encoder for each of key and value. However, in the case of an image, key and value are not clearly distinguished from each other, so information included in the key and the value may overlap, resulting in low memory efficiency. Additionally, it predicts the motion of an object in the current frame by combining the motion of the object in the past frames stored in the memory, and is performed by simply adding one frame to the memory every predetermined number of frames without considering similarity or usability between information stored in the memory, causing unnecessary memory usage.

Figure 2A:
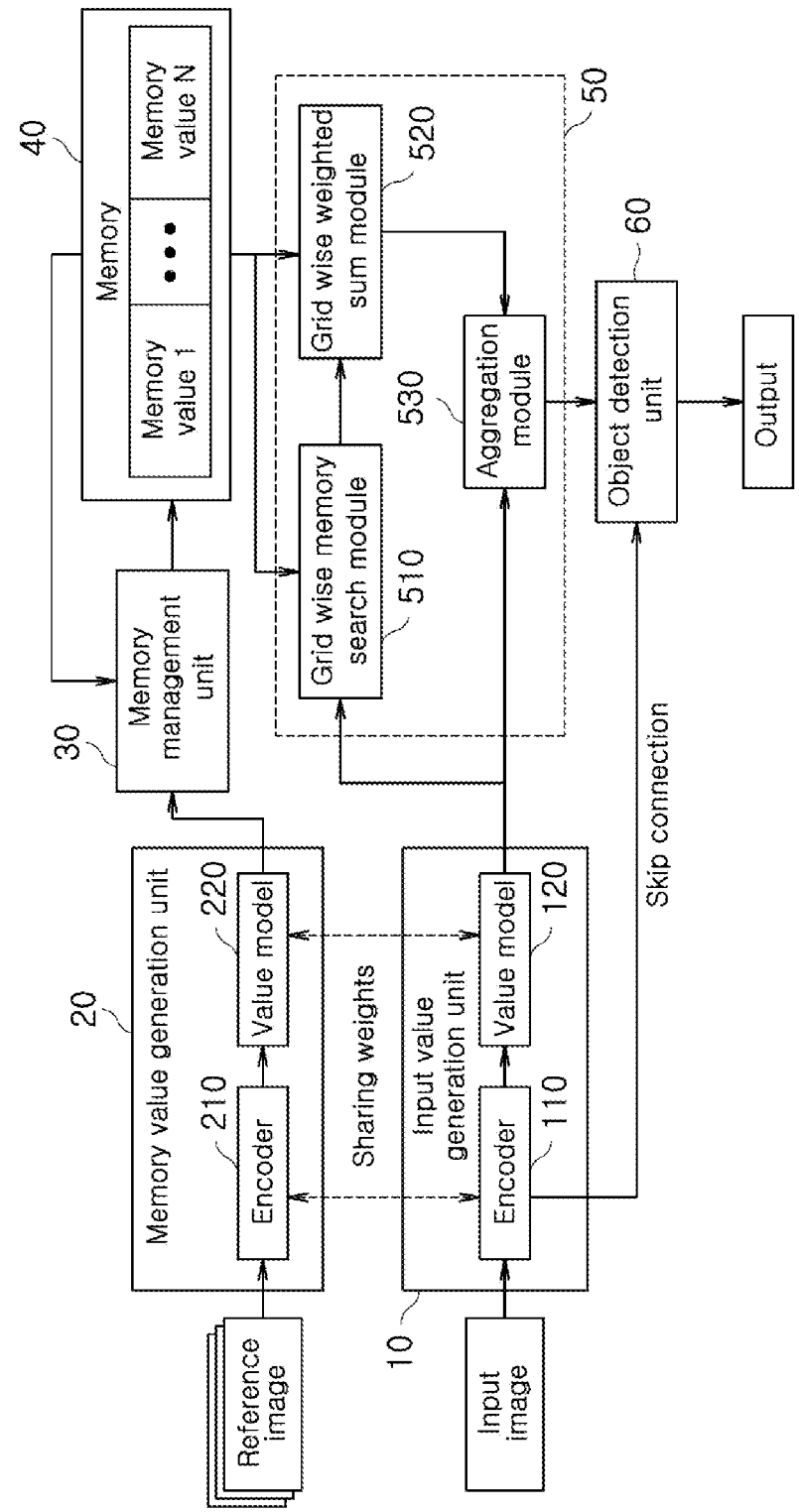
FIGS. 2A to 2D show the structure of an object detection and classification system in an image according to embodiments.

The present disclosure is aimed at solving the problem of the related art and providing a system capable of making more efficient use of the computer memory. FIGS. 2A to 2D show the structure of the proposed object detection and classification system according to embodiments. Referring to FIG. 2A, the object detection and classification system according to an embodiment includes an input value generation unit 10 to receive an input image and generate an input value including feature information; a memory value generation unit 20 to receive a reference image associated with an object and generate a memory value including feature information; a memory management unit 30 to select information having high importance from the memory values and store in the computer memory; a computer memory 40 to store the memory values selected by the memory management unit 30; an aggregated value generation unit 50 to compute similarity between the input value and the memory value, calculate a weighted sum to generate an integrated value and aggregate the integrated value and the input value to generate an aggregated value; and an object detection unit 60 to detect or classify the object from the input image using the aggregated value.

In FIG. 2A, the input image is an image including the object of interest intended to actually detect or classify. The system according to an embodiment is to configured to output a result of detecting or classifying the specific object in the input image. The reference image is an image including information associated with the object of interest, and for example, a mask image helpful for detection and classification, including the motion of the object of interest or background information or showing the location of the object of interest. In general, the reference image includes a background image intended to remove, and various motions of the object intended to detect or classify.

The input value generation unit 10 includes an input unit encoder 110 for compressing the input image into high level information and an input value model 120 for receiving the output of the input unit encoder 110 and generating an input value including high level feature information. Likewise, the memory value generation unit 20 includes a memory unit encoder 210 for compressing the reference image into high level information and a memory value model 220 for receiving the output of the memory unit encoder 210 and generating a memory value including high level feature information.

Figure 2B:
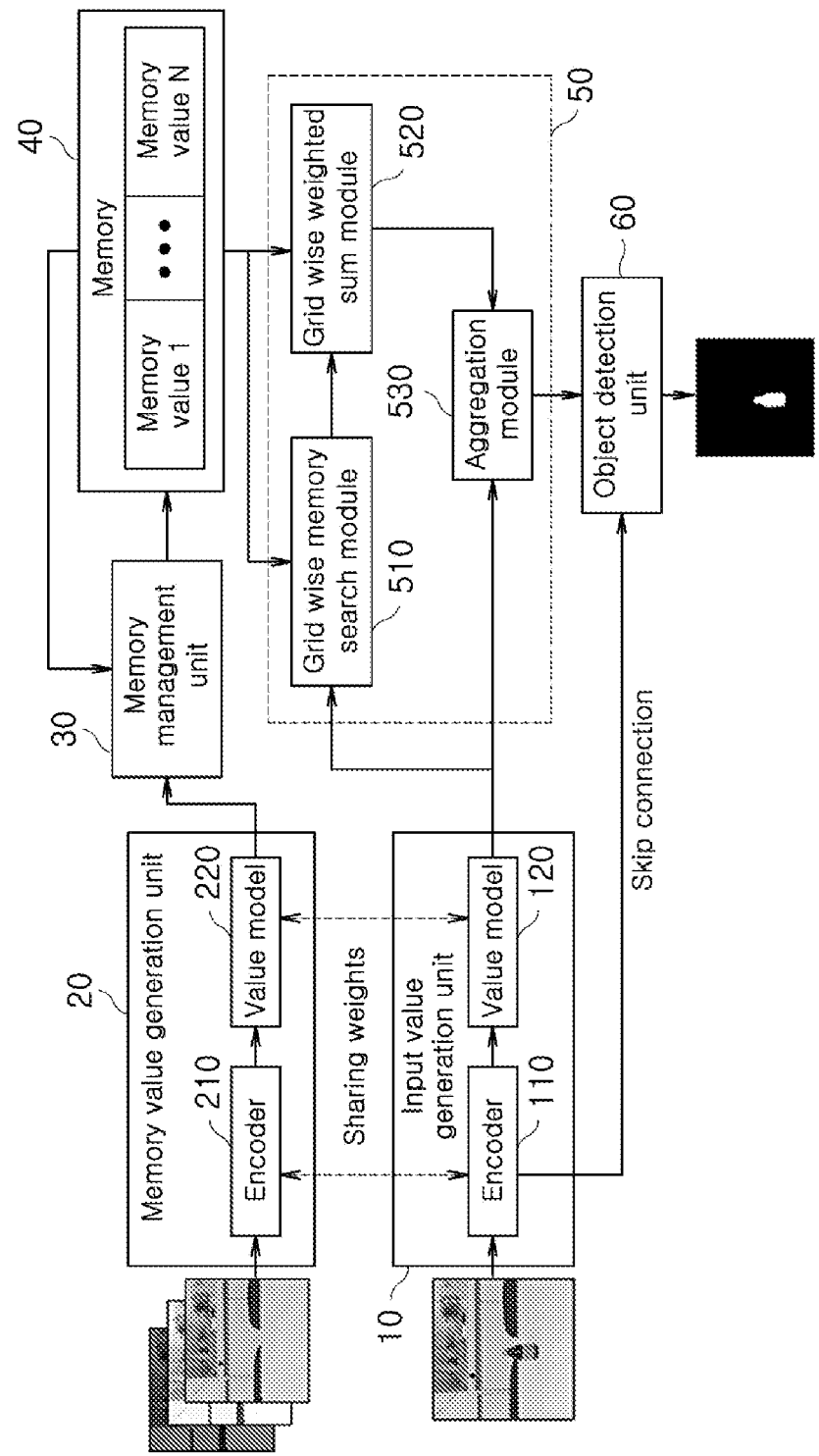

The encoders 110, 210 are machine-learning models for compressing the input image and the reference image (including masks) into high level information respectively. For example, a variety of machine-learning models including convolutional neural network (CNN), multilayer perceptron (MLP) and recurrent neural network (RNN) may be used. When the reference image has no additional information such as masks, the input unit encoder 110 and the memory unit encoder 210 may be configured as a same model sharing weights, thereby reducing an amount of computer memory used. FIG. 2B shows an actual use example in which the object detection and classification system is actually applied to the reference image having no mask and the input image.

Figure 2C:
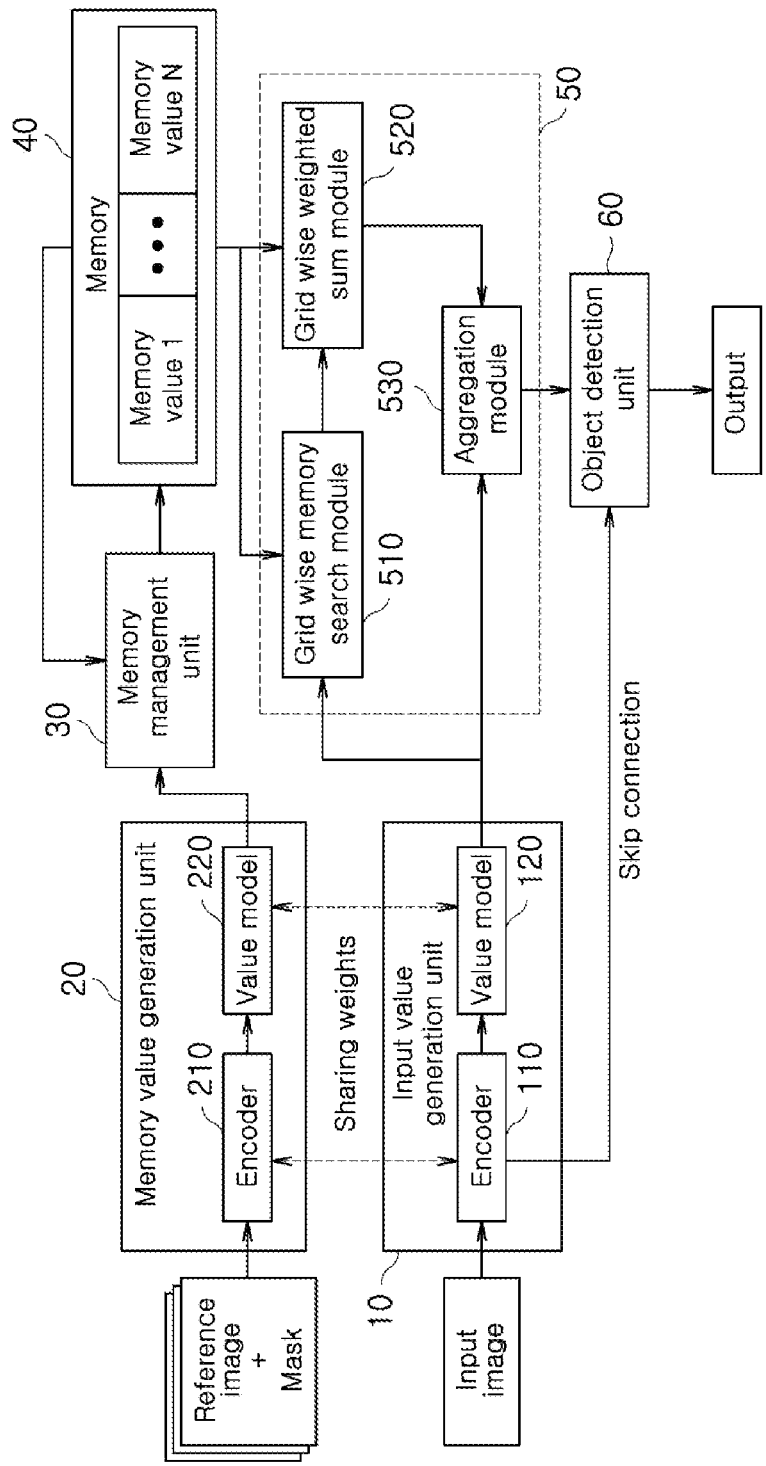
Figure 2D:
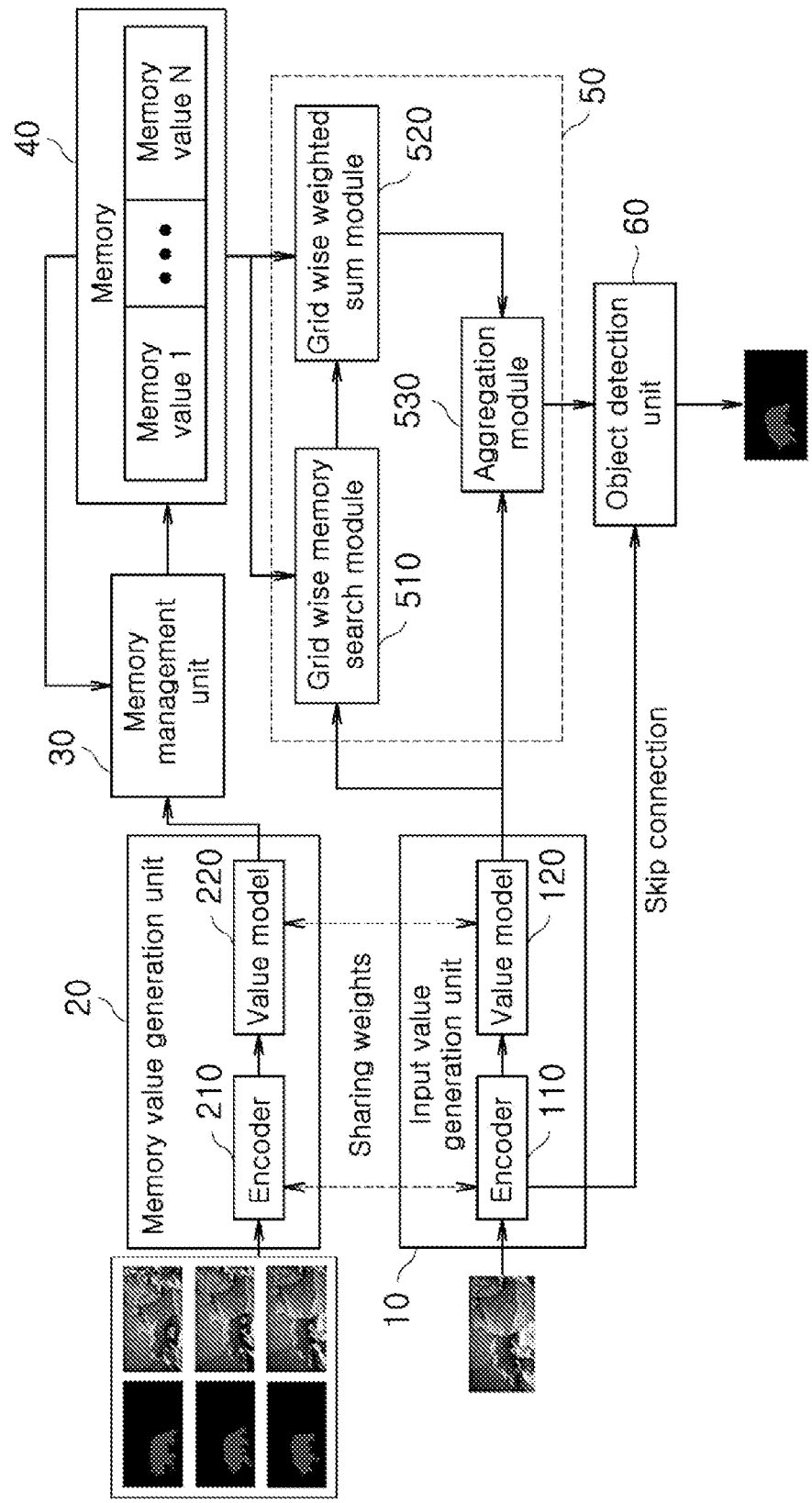

According to another embodiment, as shown in FIG. 2C, even when the reference image includes additional information such as masks, the object detection and classification system may be applied. In this instance, in the case of FIGS. 2A and 2B (i.e., in case that the reference image has no mask), the encoders 110, 120 of the input unit and the memory unit do not share weights, but the value models 120, 220 may be configured as a same model sharing weights. FIG. 2D shows an actual use example in which the object detection and classification system is actually applied to the reference image including masks and the input image.

The value models 120, 220 are machine-learning models that receive the output of the encoders 110, 120 and generate higher level of feature information respectively. In the same way as the encoders, a variety of machine-learning models including CNN, MLP and RNN may be used. According to an embodiment, irrespective of the presence or absence of masks, the input unit value model 120 and the memory unit value model 220 may be configured as a same model sharing weights, thereby reducing an amount of computer memory used. In this case, the encoders of the input unit and the memory unit need to have the same size of output.

In some cases, the encoder output may be used as a value model value without the value model.

The generated memory values are stored in the computer memory 40 through the memory management unit 30.

The memory management unit 30 plays a role in selecting information having high importance from the generated memory values and storing in the computer memory 40. The existing memory network structure does not consider similarity or usability between information stored in the memory, and thus a large amount of information overlaps, causing unnecessary memory usage. According to an embodiment, the memory management unit compares a newly generated memory value with already stored memory values, and stores the newly generated memory value only when the memory management unit deems it necessary to store, thereby increasing the memory efficiency.

For example, in the application for video, frames used in the past input image are added as a reference image for the current image. In this instance, the role of the memory management unit 30 is to select important information from the memory values generated from the reference image and update the memory.

Figure 3:
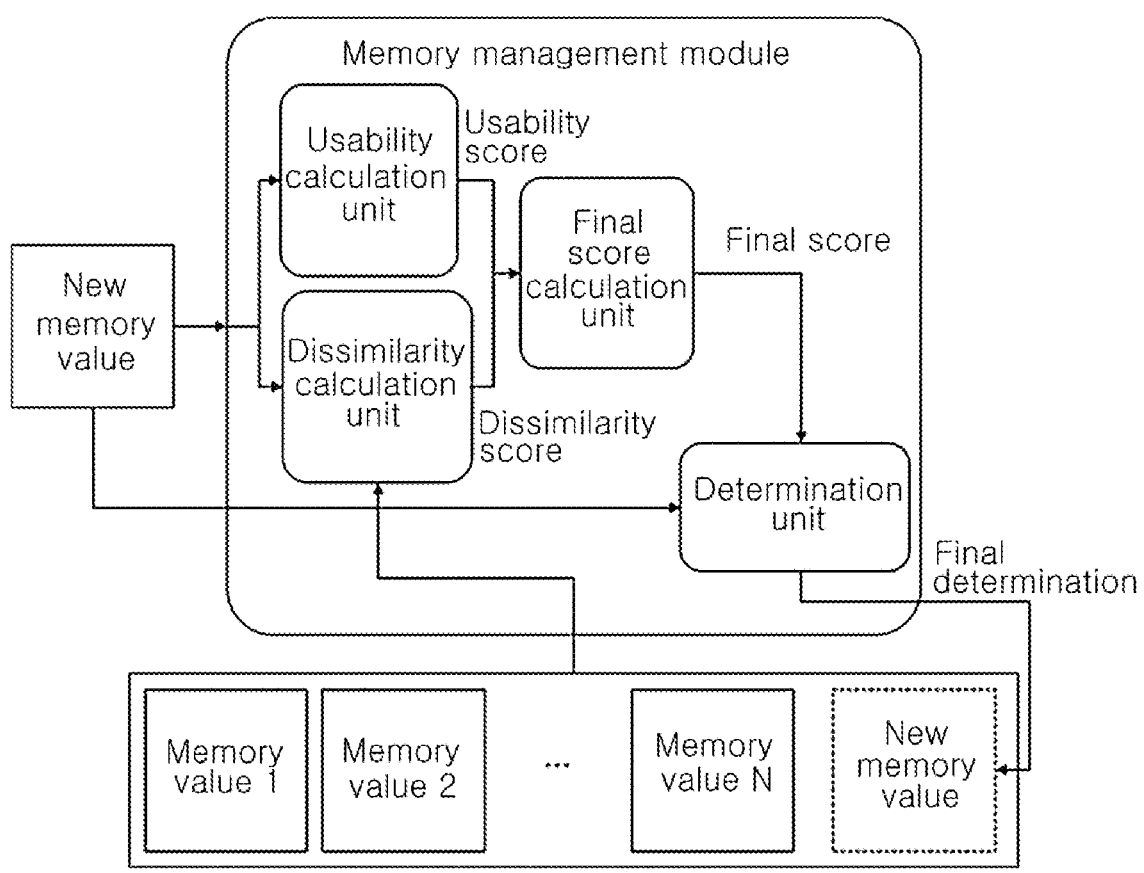
FIG. 3 shows an operating mechanism of a memory management module according to an embodiment.
Figure 4:
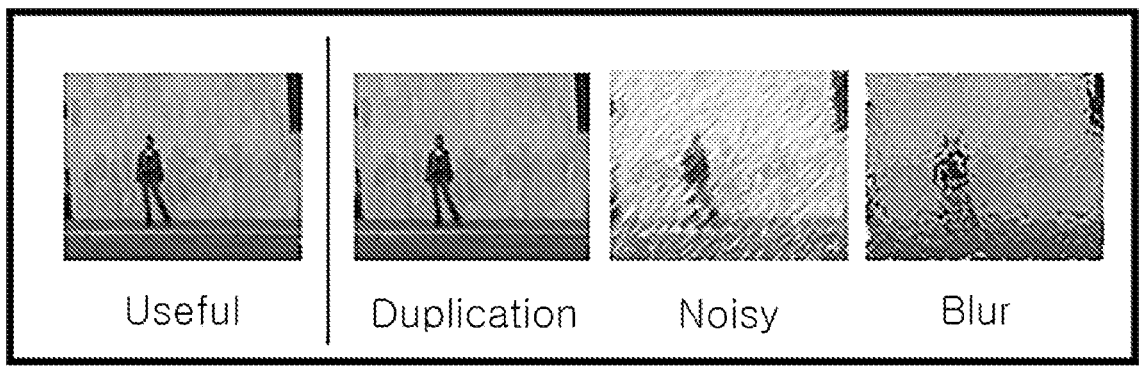
FIG. 4 is a diagram for describing the criteria for determining the importance of an image in a memory management module according to an embodiment.

FIG. 3 shows the operating mechanism of the memory management module according to an embodiment, and FIG. 4 is a diagram for describing the criteria for determining the importance of the image in the memory management module. The memory management module checks usability of a newly generated memory value and similarity between the newly generated memory value and the existing memory values. When information has low usability (too much blur or noise as shown in the right side of FIG. 4) or is identical or very similar to the memory value in the memory, the newly generated memory value is not added to the memory so as to prevent the waste of the computing memory resources.

A method for measuring the usability and similarity of the memory value may be implemented using learning through deep learning, determination using predefined criteria and mathematical similarity measurement. Usability calculated by a usability calculation unit and dissimilarity calculated by a dissimilarity calculation unit are integrated by a final score calculation unit to calculate a final score. A determination unit determines whether to store the new memory value in the memory. The entire process may be implemented in an end-to-end manner through high level learning such as reinforcement learning. In case that the memory size is limited, when the new memory value is added, the memory size may be maintained by deleting a memory value having lowest dissimilarity or an oldest memory value from the stored memory values.

Referring back to FIG. 2, the aggregated value generation unit 50 according to an embodiment includes a grid wise memory search module 510, a grid wise weighted sum module 520 and an aggregation module 530.

The gird wise memory search module 510 calculates a similarity vector by comparing the similarity between the input value generated from the input image and each memory value stored in the computer memory grid wise.

The gird wise weighted sum module 520 calculates a weighted sum of the memory values grid wise using the calculated similarity vector and converts to an integrated value. In this instance, the existing space-time memory (STM) technique uses a key-value model that finds similarity using key and sums values as shown in FIG. 1, but the present disclosure gives the function of key to its value to prevent the overlapping computer memory usage.

FIGS. 5A to 5D are diagrams for describing the operating principle of the model according to the related art, and FIGS. 6A to 6D are diagrams for describing the operating principle of the model according to an embodiment.

Figure 5A:
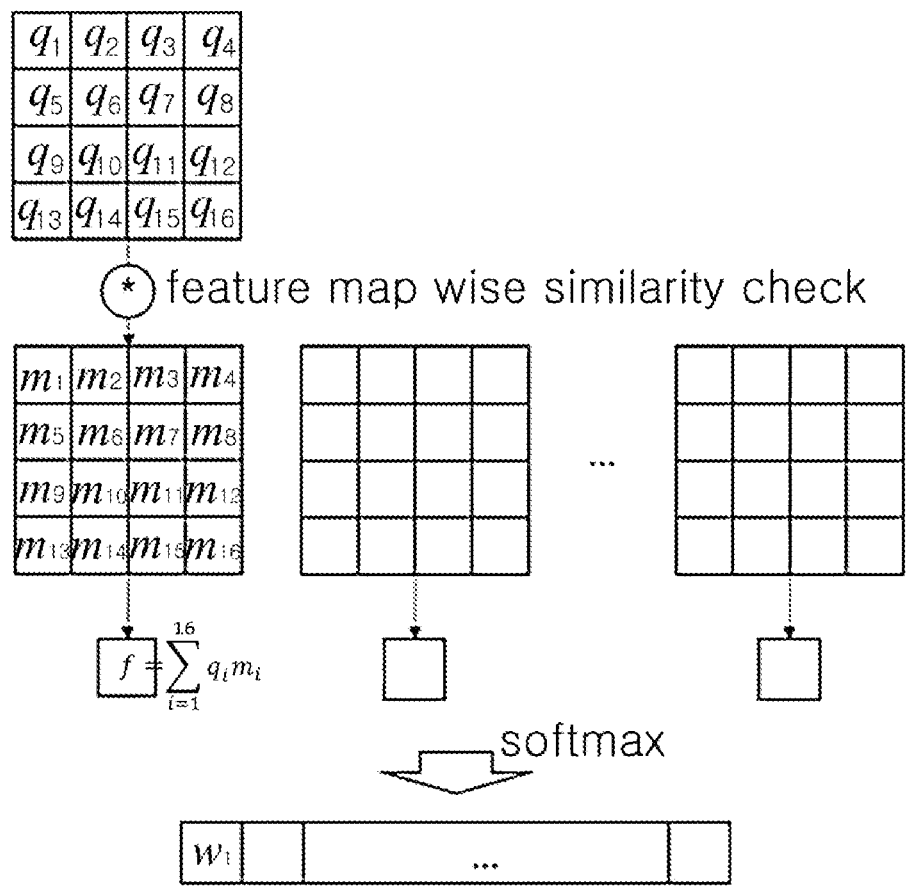

FIG. 5A shows the existing method for calculating similarity in unit of a feature map corresponding to an image. q1, q2, . . . q16 of the top matrix indicate input values which are features calculated in the input image, and m1, m2, . . . m16 of the bottom matrix indicate memory values stored in the memory.

Figure 6A:
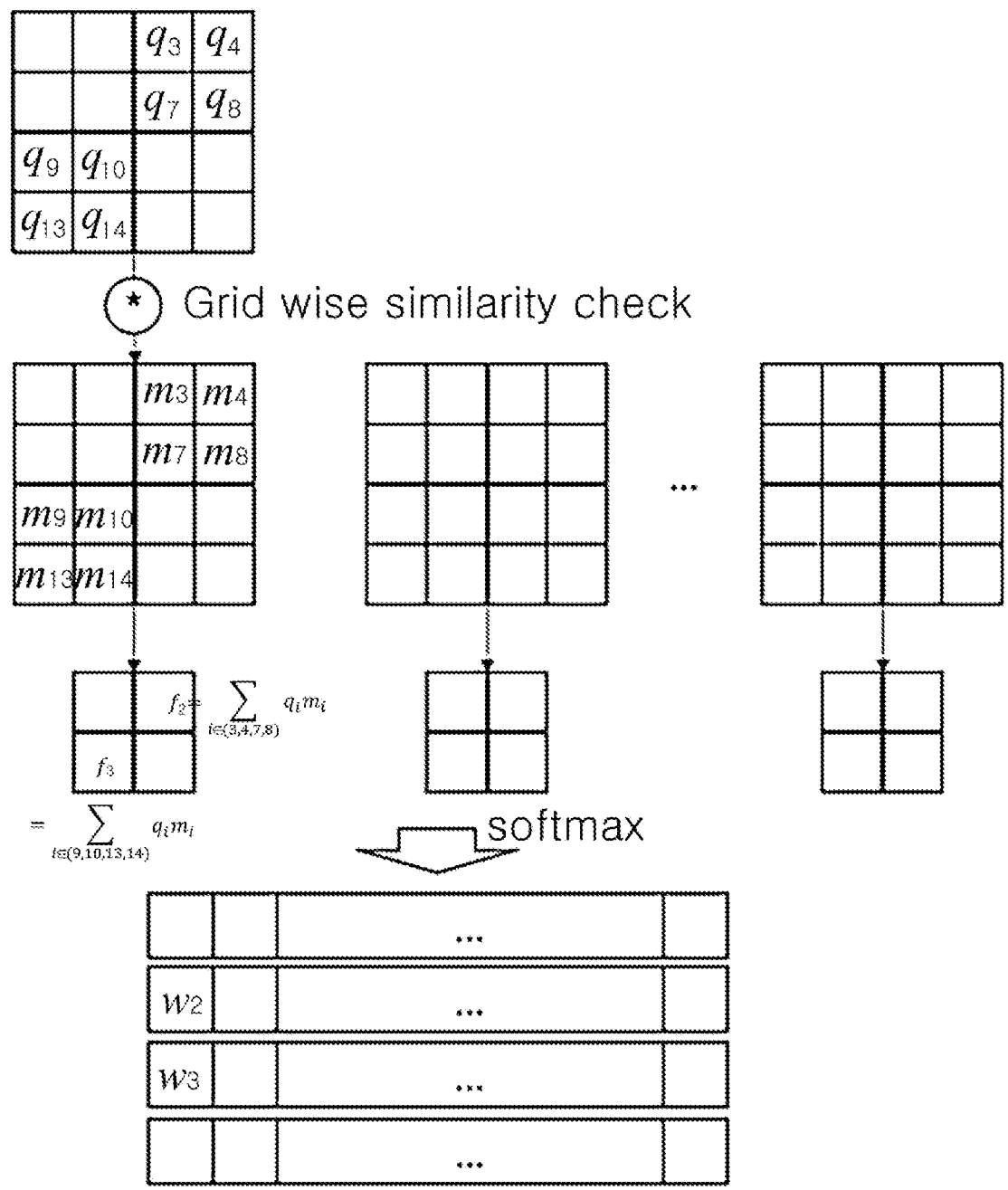
FIGS. 6A to 6D are diagrams for describing an operating principle of a model according to an embodiment.

FIG. 6A shows the operation of the grid wise memory search module, and likewise, the values of the top matrix indicate input values which are features calculated in the input image, and the values of the bottom matrix indicate memory values stored in the memory. According to an embodiment, as opposed to the existing memory search, similarity is calculated grid wise in the feature map (i.e., value). In FIG. 6A, the orange lines divide the grids, and FIG. 6A shows an example of the feature map divided into four grids. Each grid may be divided with different sizes. Here, the similarity measuring method may use a variety of algorithms (for example, dot product, Euclidean distance, cosine distance, etc.). After similarity is measured grid wise, the result value is converted by grid wise softmax.

Figure 5B:
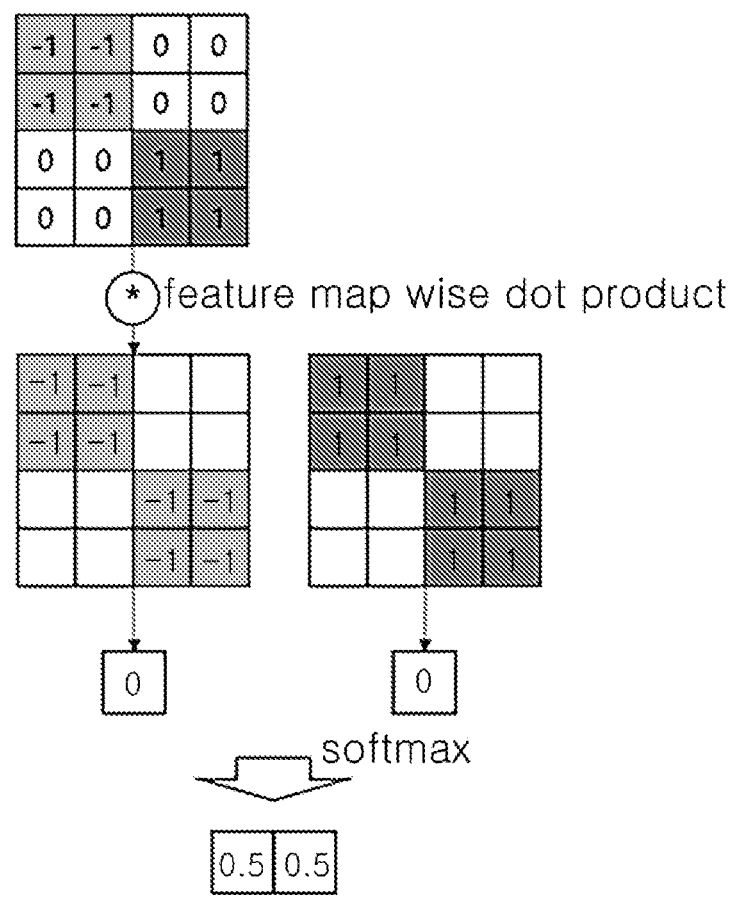
Figure 6B:
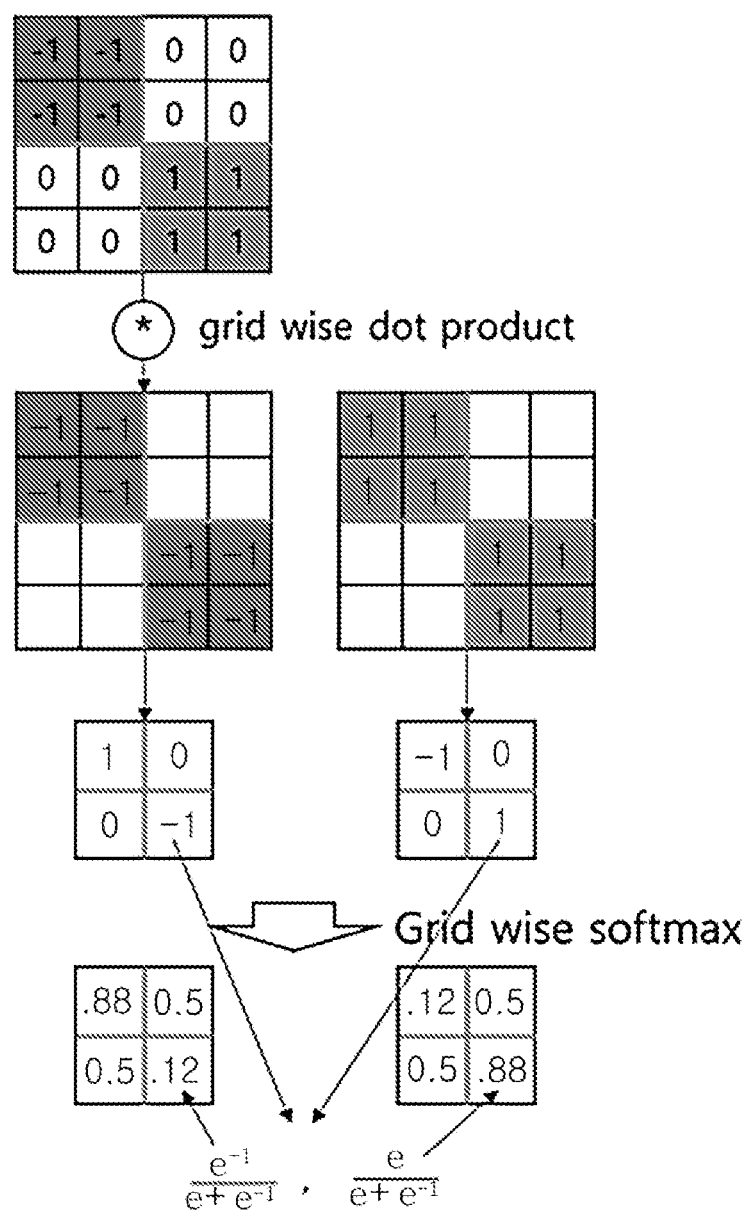

FIG. 5B shows the memory search method according to the related art, and FIG. 6B shows the operating process of the grid wise memory search module using specific exemplified values.

Figure 6C:
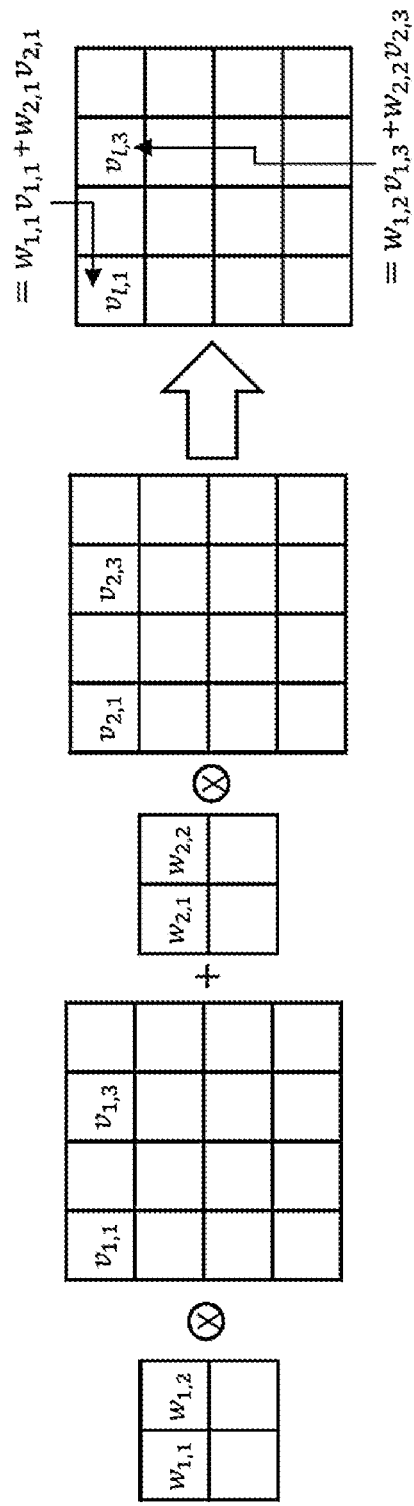

FIG. 5C shows a process of applying a single weight to each feature map according to the related art. In contrast, FIG. 6C shows a grid wise weighted sum method according to an embodiment, and weights are applied to memory values for each grid based on the previously calculated softmax similarity for each grid. This result is used as an integrated value.

Figure 5D:
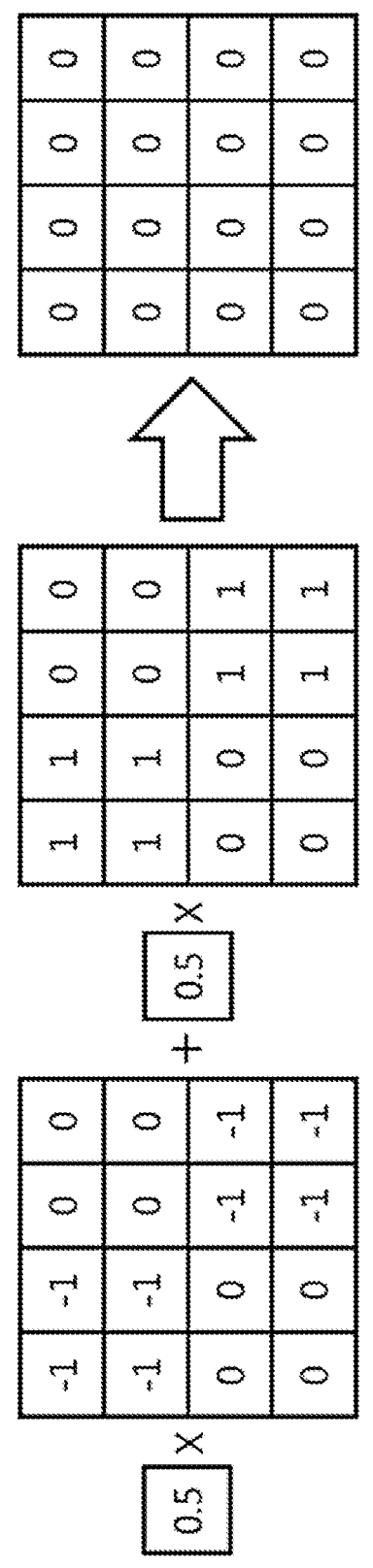
Figure 6D:
Figure 6D:
Figure 6D:

Comparing FIG. 5D with FIG. 6D, it can be seen that the grid wise performance is higher. Under the assumption that each of the matrix has a value of −1 and a value of +1, when an inner product (a dot product) is used as the similarity measuring method, it can be seen that compared to calculating similarity in the entire feature map and aggregating values based on the similarity as shown in FIG. 5D, as to shown in FIG. 6D, calculating similarity grid wise and aggregating values based on the similarity depicts the original image better. This is because the grid wise memory search method can use more combinations in aggregating the memory values. Through this, it is possible to make more diverse integrated values using a smaller number of memory values, thereby increasing the computer memory efficiency.

Referring back to FIG. 2, the aggregation module 530 aggregates the input value and the integrated value and outputs an aggregated value. In this instance, the aggregation function may be implemented as concatenate, sum, etc. For example, in general, the concatenate function may be applied to the input value and the integrated value. To remove the background from the image, aggregation may be performed by taking the absolute value after element-wise subtraction of the input value and the integrated value, and in this case, less computer memory may be used than the concatenate.

The object detection unit 60 performs the function of detecting or classifying the object from the input image using the aggregated value. The object detection unit 60 may include a decoder for detecting the object (or region) in the image based on the aggregated value, or a classifier for classifying the object (or region). In the similar way to the encoders 110, 120, the decoder or the classifier uses a general machine-learning model, but may change in structure according to tasks (for example, in the case of detection, up cony net, and in the case of classification, fully conv net).

Figure 7:
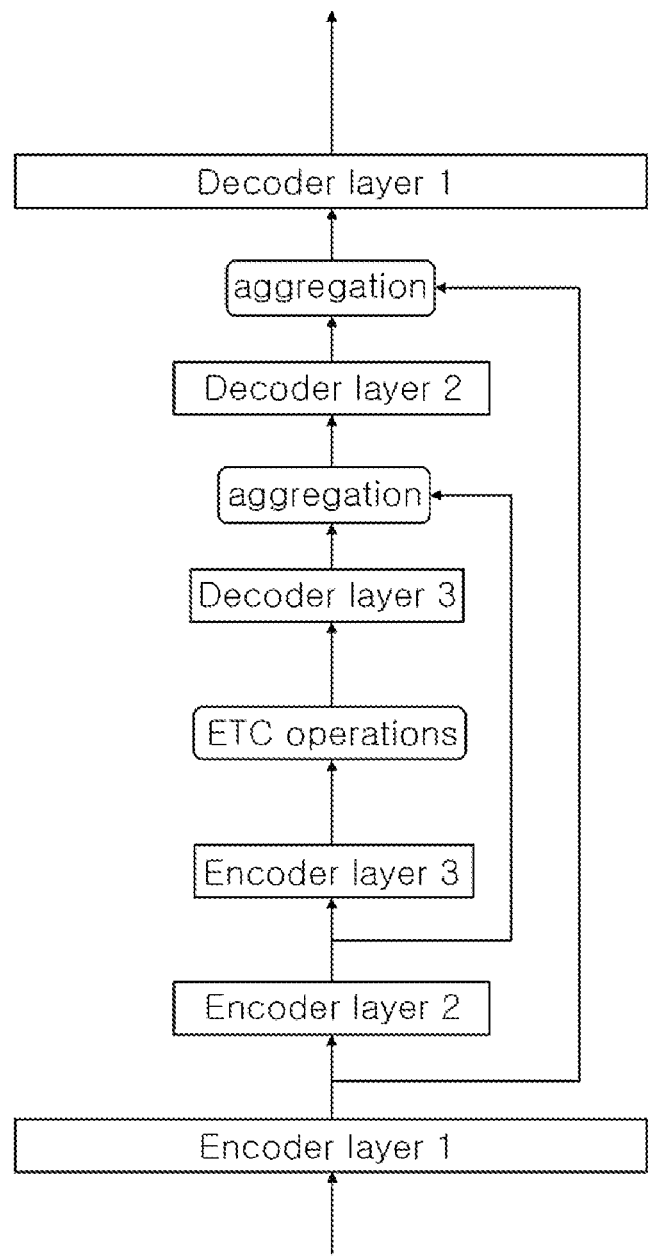
FIG. 7 is a block diagram showing a flow of data transfer via skip connections.

According to an embodiment, as shown in FIG. 2, multiple layer information of the encoder 110 of the input unit is directly transferred to the object detection unit 60 via skip connections to improve the performance of the decoder or the classifier. FIG. 7 is a block diagram showing a flow of data transfer via skip connections.

The 'output' is a finally obtained result and corresponds to an object detection result image, a background free image, and an image having classification labels for each pixel.

In the network according to an embodiment as described above, the maximum resolution of the input image that can be processed at a time is determined according to the size of the encoder. To process a larger image, it is necessary to use a larger encoder as well as a larger value model and a larger decoder, and due to the nature of the deep learning network using much memory, actually, in many situation, it is impossible to fully implement in hardware.

To solve the above-described problem, the present disclosure proposes to repeatedly detect an object/region gradually from a low resolution image to a high resolution image.

Figure 8:
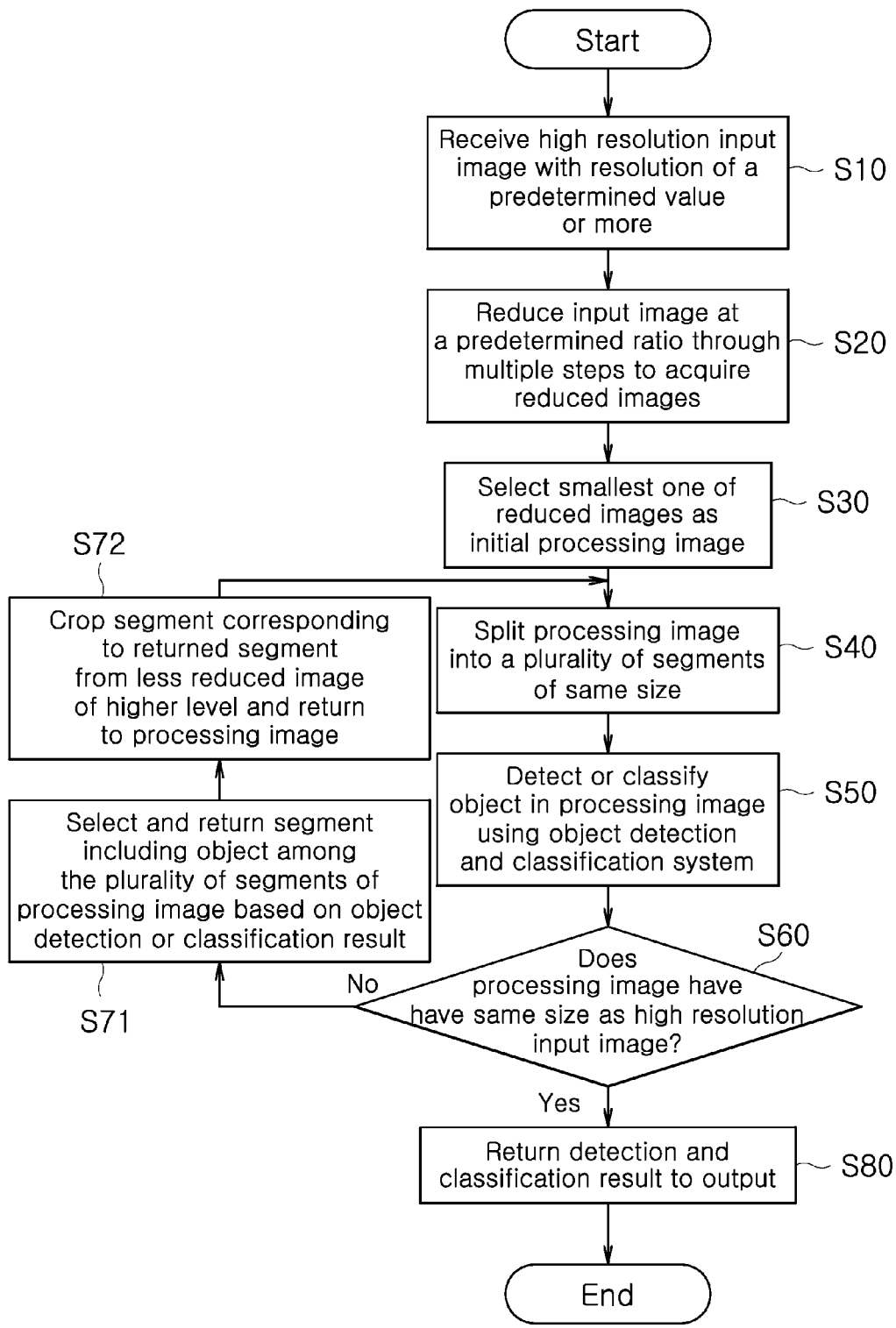
FIG. 8 is a flowchart showing each step of an object detection and classification method for a high resolution image according to an embodiment.

FIG. 8 is a flowchart showing each step of an object detection and classification method for a high resolution image according to an embodiment. Here, each step is not necessarily performed in a sequential order, and for example, some steps may be simultaneously performed by one processor, or may be performed in parallel by two or more processors.

Referring to FIG. 8, the object detection and classification method according to an embodiment may include the following steps.

S10: Receive a high resolution input image with the resolution of a predetermined value or more.

S20: Reduce the high resolution input image at a predetermined ratio through multiple steps to acquire reduced images.

S30: Select the smallest one of the reduced images as an initial processing image.

S40: Split the processing image into a plurality of segments of the same size.

S50: Detect or classify an object in the processing image using the object detection and classification system according to the above-described embodiments.

S60: Determine if the processing image has the same size as the high resolution input image. When the processing image has a smaller size than the high resolution input image ('No' in FIG. 8), S71-72 are performed, and when the processing image has the same size as the high resolution input image ('Yes' in FIG. 8), S80 is performed.

S71: Select and return a segment including the object, among the plurality of segments of the processing image based on the detection and classification result, when the processing image has a smaller size than the high resolution input image.

S72: Crop a segment corresponding to the returned segment from the reduced image of higher level that is less reduced than the processing image and return to the next processing image. Repeat S40 to S60 on the returned processing image.

S80: Return the detection and classification result to output and terminate the process, when the processing image has the same size as the high resolution input image.

Figure 9A:
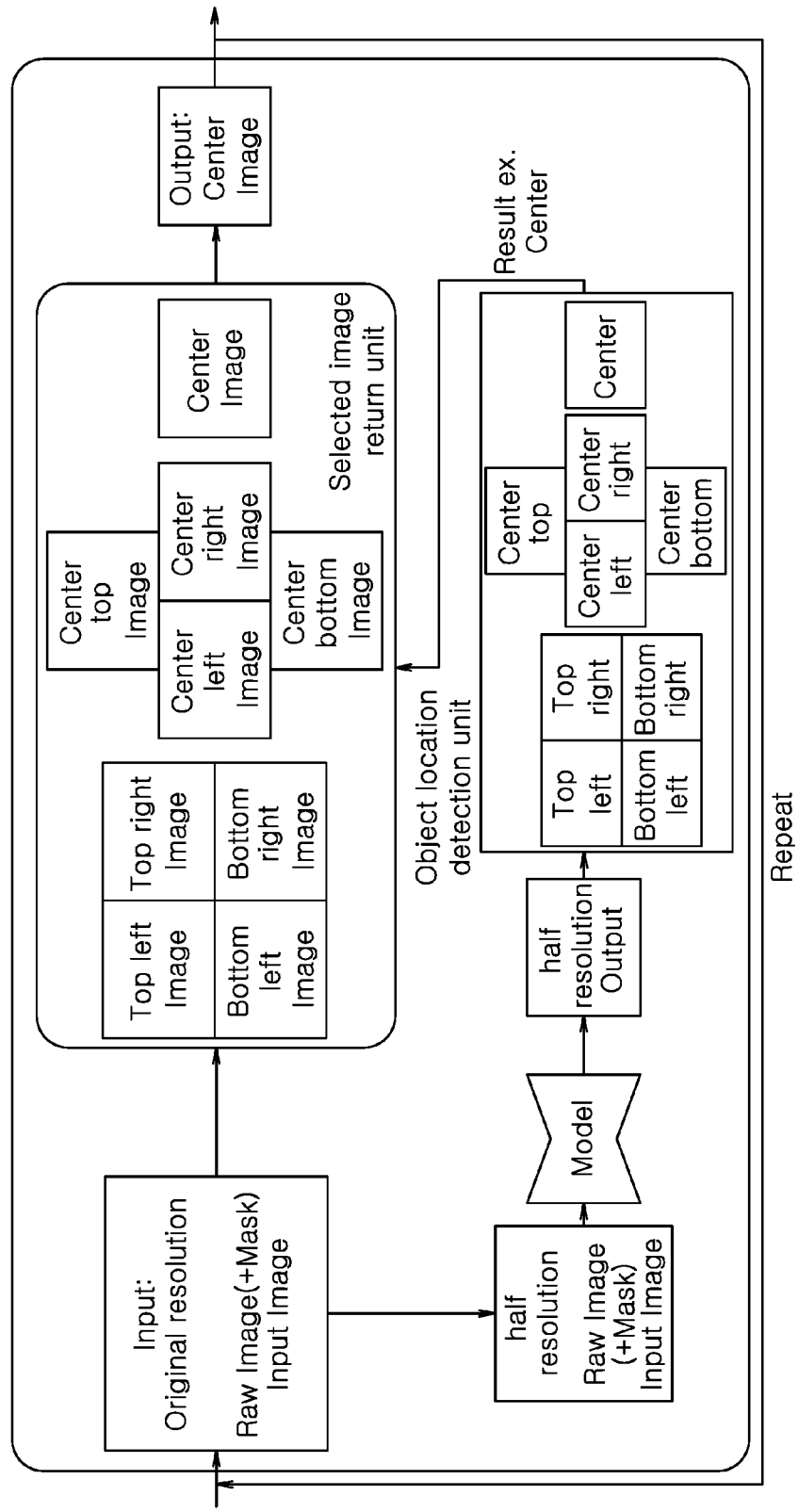
FIGS. 9A to 9C are diagrams for conceptually describing a high resolution image processing system according to an embodiment.
Figure 9B:
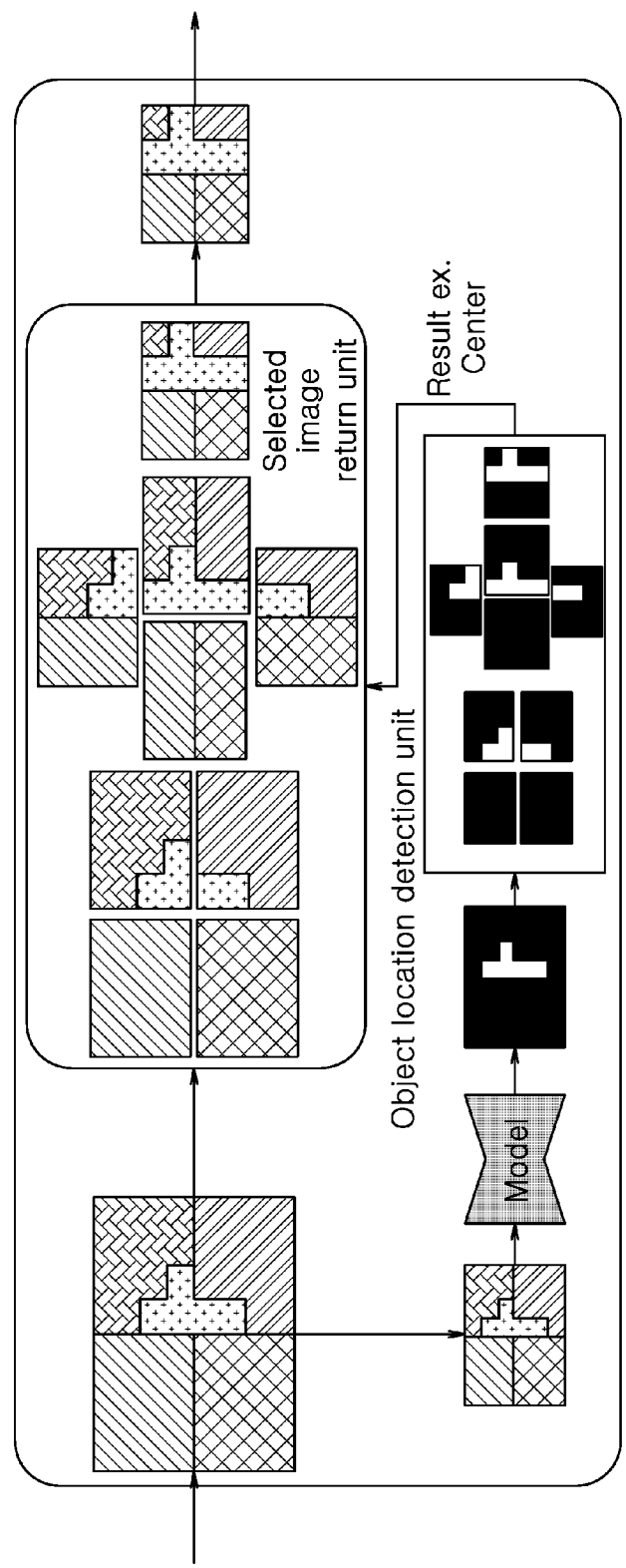
Figure 9C:
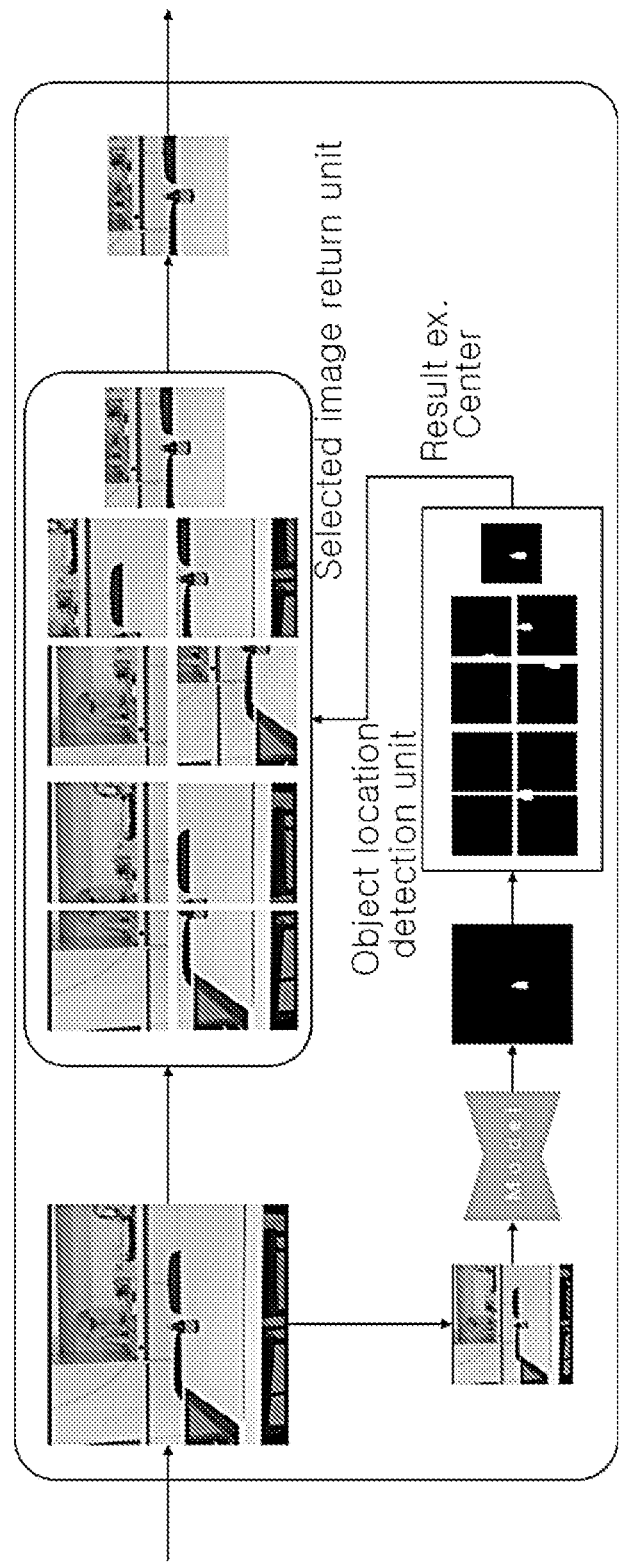

FIGS. 9A to 9C are diagrams for conceptually describing a high resolution image processing system according to an embodiment. Briefly describing, this method converts a high resolution image to a low resolution image, detects the location of an object, crops an area corresponding to the detected region from the high resolution image, detects the object again, and repeats the process. This process may be applied through multiple steps. The drawings referenced below including FIG. 9A are provided for illustration purposes to conceptually describe the processing process, and for example, the image may be split into more than four segments, or an additional processing module may be further included.

In FIG. 9A, 'Input' is an input image having the original resolution (i.e., too high resolution to process at a time). The input image is split into a plurality of segments having the same size and stored in a 'selected image return unit'. Here, the size of each split image is ¼ of the original image size (reduce the horizontal and vertical size to ½). The top left, top right, bottom left and bottom right images are quadrant images as a result of splitting the input image into four equal segments. When the input image is split into upper and lower parts, the center top image refers to a ½ cropped image from the center in the horizontal direction of the upper part, and the center bottom image refers to a ½ cropped image from the center in the horizontal direction of the lower part. When the input image is split into left and right parts, the center left image refers to a ½ cropped image from the center in the vertical direction of the left part, and the center right image refers to a ½ cropped image from the center in the vertical direction of the right part. The center image refers to an image cropped as much as ½ size of the horizontal and vertical resolution from the center of the input image.

In the lower flow of FIG. 9A, 'half resolution' is an image as a result of reducing the input image to ¼ size (reducing the horizontal and vertical size to ½). 'Model' is one of the object detection and classification models according to the above-described embodiments. 'Half resolution output' is a result value of processing by applying the model to the half resolution image.

The 'object location detection unit' detects if each area includes the object based on the result value generated in the model and outputs an area in which the object is included in the image. In this instance, it may be variously implemented depending on many conditions, for example, 'output only a location including the largest number of objects' or 'output all locations including objects'.

The 'result' is an image outputted according to the conditions, and for example, in case that the image is segmented in many aspects, when the most parts of the object are included in the central area (an area cropped as much as ½ size of the horizontal and vertical resolution from the center of the image), it is outputted as a result value.

The 'selected image return unit' returns one of the images split according to the result. The 'output' refers to the returned image. In the example of FIG. 9A, the center image in the input image is selected and returned. The returned image enters the model of FIG. 2 as an input image, and reference images of high resolution size are segmented with the same size at the same location as the output and used as reference image of the model of FIG. 2.

FIG. 9B shows another image of the operating process of the high resolution image processing system of FIG. 9A to help understanding, and FIG. 9C is an actual photographic image including the object of interest. As shown in FIGS. 9B and 9C, the object location detection step is performed by reducing the high resolution image, an image satisfying the conditions among the segmented high resolution images is returned, and this process is repeatedly performed, thereby detecting or classifying the object in the high resolution image in a memory efficient manner.

Figure 10:
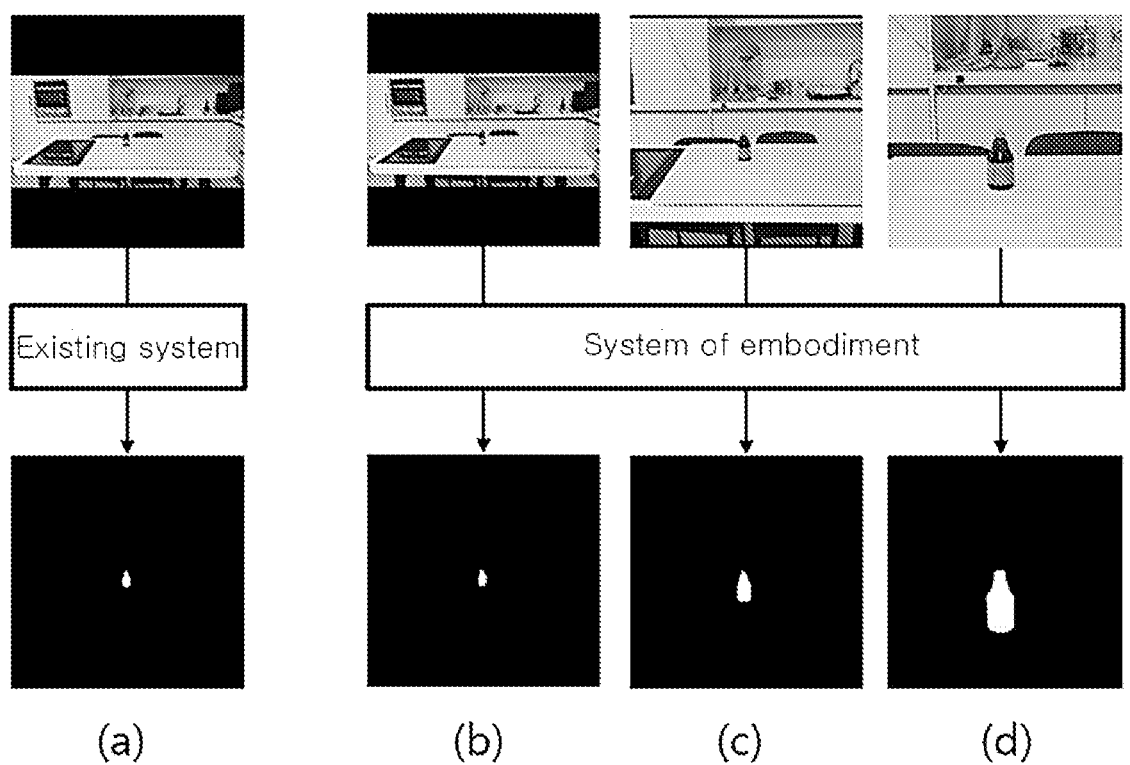
FIG. 10 shows a result of detecting an object in an input image using each of a system according to the related art and a system according to an embodiment.

FIG. 10 shows a result of detecting the object in the input image using each of the system according to the related art and the system according to an embodiment. (a) of FIG. 10 shows the object detection result according to the existing system, (b), (c) and (d) show the object detection result according to the system of an embodiment, and it can be seen that it is possible to obtain the result of higher resolution than the existing system.

Figure 11:
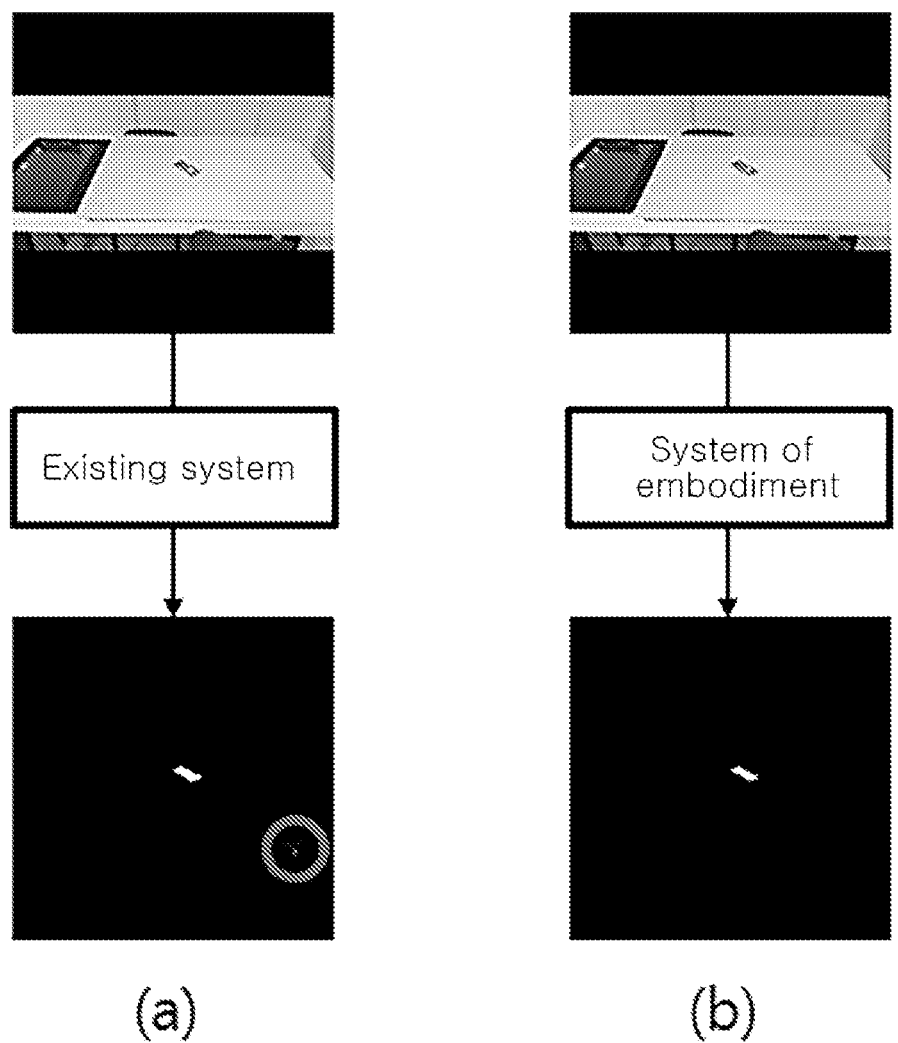
FIG. 11 shows a result of detecting an object in an input image using each of a system according to the related art and a system according to an embodiment.

FIG. 11 shows a result of detecting the object in the input image using each of the system according to the related art and the system according to an embodiment. (A) of FIG. 11 shows the object detection result according to the existing system, (B) shows the object detection result according to the system according to an embodiment, and it can be seen that the existing system (feature map based search) shows an inaccurate result such as detection of an object (indicated by a red circle) other than the object of interest, while the system of an embodiment obtains a more accurate result using the same memory frame by the effect of the grid wise memory search.

The object detection and classification method according to an embodiment may be implemented in the form of applications or program commands that can be executed through a variety of computer components, and recorded in computer-readable recording media. The computer-readable recording media may include program commands, data files and data structures, alone or in combination.

Examples of the computer-readable recording media include hardware devices designed to store and execute the program commands, for example, magnetic media such as hard disk, floppy disk and magnetic tape, optical media such as CD-ROM and DVD, magneto-optical media such as floptical disk, and ROM, RAM and flash memory.

According to the object detection and classification system as described above, it is possible to detect or classify the object in the image with higher accuracy in a less computer memory environment than the existing method. Additionally, it is possible to detect or classify an object in a high resolution image of a size that is impossible for the existing method with low memory efficiency to process.

Object detection in the input image is core technology in the image processing and can be used in a variety of technical fields including autonomous vehicles, CCTV surveillance and medical applications.

While the present disclosure has been hereinabove described with reference to the embodiments, those skilled in the art will understand that various modifications and changes may be made thereto without departing from the spirit and scope of the present disclosure defined in the appended claims.

What is claimed is:

1. An object detection and classification system with improved computer memory efficiency, comprising computer components and program commands executable by the computer components to implement the following units:
   an input value generation unit to receive an input image and generate an input value including feature information, the input image including an object intended to be detected and classified;
   a memory value generation unit to receive a reference image and generate a memory value including feature information, the reference image being associated with the object;

a memory management unit to select information having high importance from the memory values and store the selected information in a computer memory;

an aggregated value generation unit configured to:
  compute similarity between the input value generated from the input image and the memory value stored in the computer memory;
  calculate a weighted sum of memory values to generate an integrated value; and
  aggregate the integrated value and the input value to generate an aggregated value; and an object detection unit to detect or classify the object from the input image using the aggregated value.

2. The system according to claim 1, wherein the aggregated value generation unit configured to:
  calculate a similarity vector by computing the similarity between the input value and the memory value grid-wise; and
  calculate the weighted sum of memory values grid-wise based on the similarity vector and convert the weighted sum to an integrated value.

3. The system according to claim 1, wherein the memory management unit stores a newly-generated memory value in the computer memory only when an importance of the newly-generated memory value is equal to or higher than a predetermined value, to increase memory efficiency, and
  in case of a newly-generated memory value that is stored to the computer memory when the computer memory has a limited size, the memory management unit deletes a memory value having a highest similarity or an oldest memory value among already stored memory values from the computer memory.

4. The system according to claim 3, wherein as a similarity of the newly-generated memory value with the already stored memory values is lower and a larger amount of useful information suited for purpose is included in the image, the importance of the newly-generated memory value is measured higher.

5. The system according to claim 1, wherein the input value generation unit includes:
  an input unit encoder implemented as a machine-learning model for compressing the input image into high-level information; and
  an input value model for receiving output of the input unit encoder and generating an input value including high-level feature information, and the memory value generation unit includes:
  a memory unit encoder implemented as a machine-learning model for compressing the reference image into high-level information; and
  a memory value model for receiving output of the memory unit encoder and generating a memory value including high-level feature information.

6. The system according to claim 5, wherein the input unit encoder and the memory unit encoder are configured as a same machine-learning model sharing weights.

7. The system according to claim 5, wherein the input value model and the memory value model are configured as a same value model sharing weights.

8. A method for detecting or classifying an object in a high-resolution image, comprising:
  receiving a high-resolution input image with resolution of a predetermined value or more;
  reducing the input image at a predetermined ratio through multiple steps to acquire reduced images;
  selecting a smallest one of the reduced images as an initial processing image;
  splitting the processing image into a plurality of segments of a same size;
  detecting or classifying the object in the processing image using the object detection and classification system according to claim 1;
  determining if the processing image has a same size as the high-resolution input image;
  selecting, when the processing image has a smaller size than the high-resolution input image, a segment including the object among the plurality of segments of the processing image based on a detection and classification result, and returning the selected segment;
  cropping a segment corresponding to the returned segment from the reduced image of a higher level that is less reduced than the processing image;
  returning the cropped segment as the processing image;
  repeating a part or all of the above steps on the returned processing image; and
  returning the detection and classification result to output when the processing image has a same size as the high-resolution input image.

9. A computer program recorded on a non-transitory computer-readable recording medium included in a computer system, the computer program for causing the computer system to perform the method according to claim 8.

* * * * *